United States Patent
Sharma et al.

(10) Patent No.: US 8,113,290 B2
(45) Date of Patent: Feb. 14, 2012

(54) DISSOLVABLE CONNECTOR GUARD

(75) Inventors: Ashish Sharma, Friendswood, TX (US); Dinesh R. Patel, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 203 days.

(21) Appl. No.: 12/556,286

(22) Filed: Sep. 9, 2009

(65) Prior Publication Data

US 2011/0056702 A1    Mar. 10, 2011

(51) Int. Cl.
E21B 29/02    (2006.01)
E21B 17/02    (2006.01)

(52) U.S. Cl. .............. 166/376; 166/242.6; 166/242.7; 166/378

(58) Field of Classification Search .......... 166/376, 166/378, 242, 6, 242.7, 242.1
See application file for complete search history.

(56) References Cited

U.S. PATENT DOCUMENTS

| | | | |
|---|---|---|---|
| 6,752,397 B2 | 6/2004 | Kohli et al. | |
| 7,222,676 B2 | 5/2007 | Patel et al. | |
| 7,380,600 B2 | 6/2008 | Willberg et al. | |
| 7,565,929 B2 | 7/2009 | Bustos et al. | |
| 2006/0124310 A1 | 6/2006 | Lopez de Cardenas et al. | |
| 2006/0260803 A1 | 11/2006 | Meijer et al. | |
| 2007/0017675 A1 | 1/2007 | Hammami et al. | |
| 2007/0044958 A1 | 3/2007 | Rytlewski et al. | |
| 2007/0107908 A1 | 5/2007 | Vaidya et al. | |
| 2008/0047703 A1* | 2/2008 | Stoesz et al. | 166/65.1 |
| 2008/0099209 A1 | 5/2008 | Loretz et al. | |
| 2008/0149351 A1 | 6/2008 | Marya et al. | |
| 2008/0245536 A1 | 10/2008 | Stoesz | |
| 2009/0056947 A1 | 3/2009 | Du et al. | |
| 2009/0126945 A1 | 5/2009 | Sharma et al. | |
| 2009/0151949 A1 | 6/2009 | Marya et al. | |

FOREIGN PATENT DOCUMENTS

| | | |
|---|---|---|
| EP | 0943954 A2 | 9/1999 |
| WO | 2008079486 A1 | 7/2008 |

* cited by examiner

Primary Examiner — Giovanna Wright
(74) Attorney, Agent, or Firm — Brandon S. Clark; Rodney Warfford; Daryl Wright

(57) ABSTRACT

A connector guard is provided to protect one or both downhole connectors during wellbore run in prior to mating downhole. The connector guard may comprise dissolvable or degradable material and include an engagement sections and a removal feature. The connector guard may be dissolved or degraded via a reactive agent or temperature either introduced downhole proximate to the guards or contained within a chamber included in or created by a connector guard. The connector guard may be further coupled by a non-reactive cover in order to control the rate of reaction of the dissolvable material. The cover may be breached prior to mating of the downhole connectors.

16 Claims, 3 Drawing Sheets

DISSOLVABLE CONNECTOR GUARD

RELATED APPLICATIONS

This application is related to co-pending U.S. patent application Ser. No. 12/430,298, the contents of which are hereby incorporated by reference.

BACKGROUND

1. Field of the Invention

Embodiments of the present invention generally relate to protective devices used for the protection of wellbore equipment, and more particularly, as an example but not as a limitation, to connector guards used to protect downhole connections, although other embodiments may exist in a wide variety of applications beyond this general area.

2. Description of the Related Art

The following descriptions and examples are not admitted to be prior art by virtue of their inclusion in this section.

In order to more efficiently and effectively produce oil from increasingly scarce sources, well systems have had to adapt with a variety of intelligent downhole devices. These downhole devices and tools, such as valves, sensors, and pumps, among others, typically require some sort of conduit to the surface or to other devices located further up in the well in order to provide power, communication, or both. The conduit may be in the form of an electrical cable, fiber optic cable, hydraulic control line, or hybrid combination of existing types of cables, among others.

However, another issue also complicates the ability to efficiently and effectively produce oil from a reservoir. Many current reservoirs, when they are located, are provided deep within the earth or under the sea. Completing a well may then require using two or more completions, such as an upper completion and a lower completion as a simple example. A similar situation also requiring multiple completions may exist when completing multi-zone sections of a lateral or vertical well or multiple branches of multilateral well. If a downhole device is located in a lower completion or a lateral branch, for example, a power and/or communication conduit may have to be extended to the downhole device from an upper location of the well. In order to establish this conduit, a downhole connection between the various completion sections would have to be performed in the typically harsh and dirty environment of the wellbore. These types of connections may be referred to as wet-mate connections.

Scales, sand, downhole fluids, grease, sheared rubber/element particles, mud, rocks, etc., are some examples of debris common in a wellbore environment. This downhole debris can cause a number of potential problems in attempting to perform a wet-mate connection. Hard debris may create an offset between the mating downhole connector parts and therefore cause them either to not mate with each other or to only partially mate with one another. The debris may damage or deform the mating surfaces of the connectors and the equipment, resulting in physical damage to the exposed connector ends. The debris may plug or block off ports or holes in the connector parts. In addition, the corrosive downhole fluids can damage the internal parts of the mating devices prior to the start of a wet-mate connection sequence.

SUMMARY

In accordance with one embodiment of the invention is a connector guard comprising a body composed of a material that is dissolvable or degradable when exposed to one or more conditions configured to react with the material. The connector guard may further comprise a connector interface configured to attach to a downhole connector.

In accordance with another embodiment of the invention is method for protecting downhole connectors during a downhole mating sequence comprising covering at least one of a mating pair of downhole connectors with a dissolvable connector guard. Another step may be breaking or breaching a non-dissolvable coating on the dissolvable connector guard during the mating of the downhole connectors. A further step may be exposing the dissolvable connector guard to one or more conditions that are selected to dissolve the dissolvable connector guard.

Other or alternative features will become apparent from the following description, from the drawings, and from the claims.

BRIEF DESCRIPTION OF THE DRAWINGS

Certain embodiments of the invention will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

In the following description, numerous details are set forth to provide an understanding of the present invention. However, it will be understood by those of ordinary skill in the art that the present invention may be practiced without these details and that numerous variations or modifications from the described embodiments may be possible. In the specification and appended claims: the terms "connect", "connection", "connected", "in connection with", "connecting", "couple", "coupled", "coupled with", and "coupling" are used to mean "in direct connection with" or "in connection with via another element"; and the term "set" is used to mean "one element" or "more than one element". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the invention.

Figure 1:
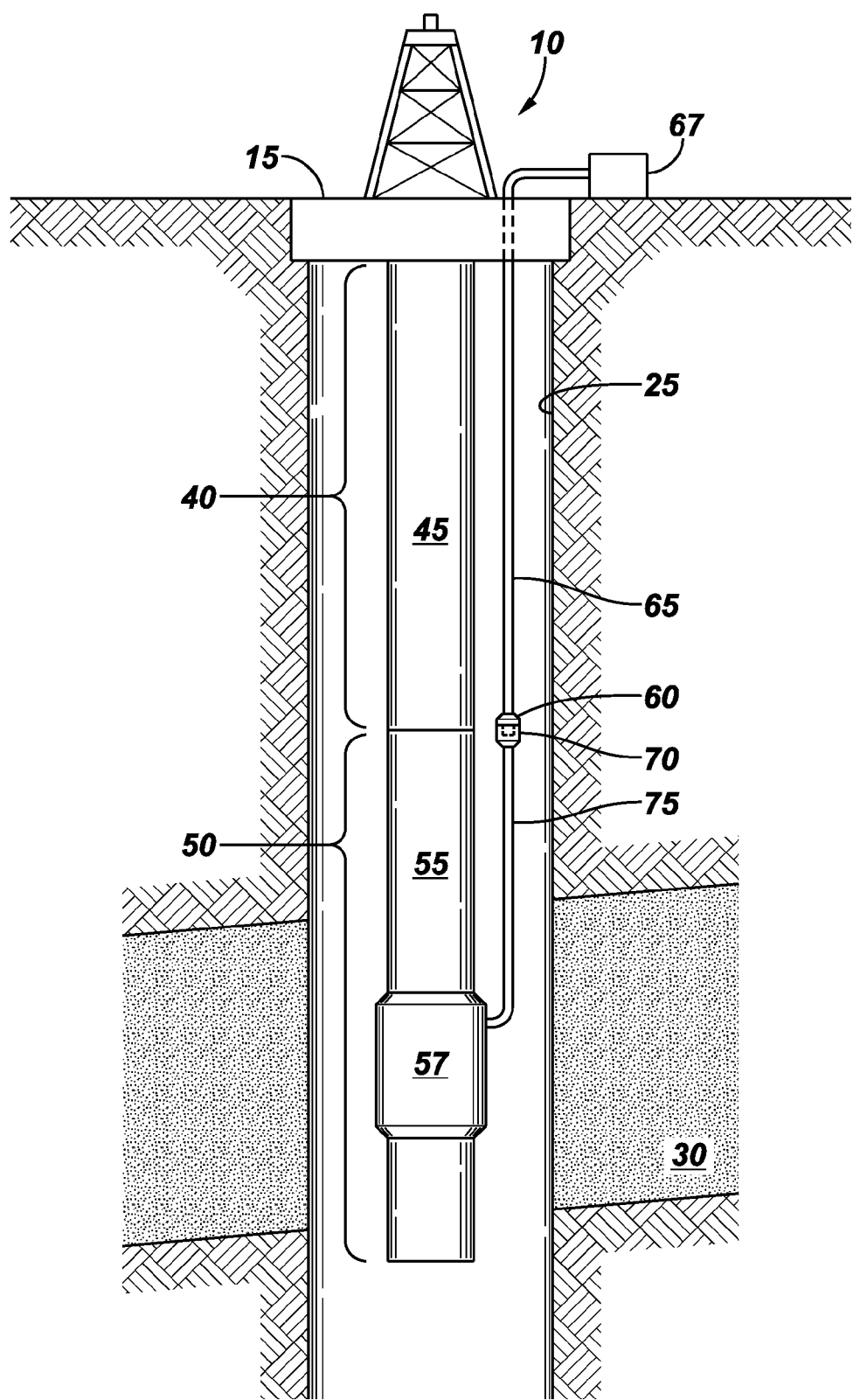
FIG. 1 is a general schematic of a well system comprising a multipart completion and downhole connection, according to an embodiment of the present invention.

Referring generally to FIG. 1 as an illustrative example, a well system 10 may be provided at a surface 20 location in order to produce a desirable fluid (e.g., oil, natural gas, methane, water, etc.) from a reservoir formation 30. The well system 10 may be coupled to the formation 30 via a well head 15 and a cased or uncased wellbore 25 (an uncased wellbore 25 is shown in this example). Although the well system 10 in this figure is shown at a terrestrial surface 20, embodiments of the disclosure may not be limited to this example. The well system 10 may also be provided at a subsea location, may comprise a deviated or horizontal well, may be a multilateral well, or may comprise some combination of well types, for example.

The wellbore 25 of the well system 10 may be completed with a multi-part completion, such as with an upper completion 40 and a lower completion 50. Multi-part completions may also be used in multi-zone wells extending over large distances and multilateral wells in which a single wellbore has one or more lateral branches extending therefrom, among others. In this illustrative example, a lower completion 50 may be installed first with lower production tubing 55 and a downhole device 57. The downhole device 57 may be coupled to a lower conduit 75 terminated with a lower downhole connector 70 (shown in this example as a female downhole connector, but not limited to this configuration).

The upper completion 40 may comprise upper production tubing 45 and an upper conduit 65 terminated at one end with an upper downhole connector 60. The other end of the upper conduit 65 may be terminated to a surface mounted device 67 or other intermediary device or tool. The conduit may be a hydraulic control line, electrical cable, fiber optic cable or similar. The upper downhole connector 60 will be engaged and connected to the lower downhole connector 70 during the landing of the upper completion 40. As illustrated, this connection between the upper and lower downhole connectors 60, 70 takes place in the wellbore 25, typically under harsh environmental conditions. Once coupled together, the upper and lower downhole connectors 60, 70 form a joint establishing a single conduit connecting the downhole device 57 to a surface unit 67 (or communication station, or control station, hydraulic unit among others) via the upper conduit 65 and the lower conduit 75.

The downhole device 57 may be a sensor, valve, intelligent device, or other downhole tool. In the case in which the downhole device 57 is a distributed temperature sensor (DTS), then the upper and lower conduits 65, 75 will contain fiber optic cables and the upper and lower downhole connectors 60, 70 will splice together ends of the fiber optic cables. In another case, the downhole device 57 may be an ESP (electronic submersible pump) or a variable choke, in either case, the upper and lower conduits 65, 75 may comprise power and/or communication passageways. In still other cases, the power supplied through the upper and lower conduits 65, 75 may be in the form of hydraulic power, in which case the upper and lower downhole connectors 60, 70 would couple together hydraulic control lines.

One embodiment for the upper and lower downhole connectors 60, 70 is represented by the male and female connectors shown in the figure, but this is only a clarifying simplification in the interest of shortening the disclosure and should not be considered a limiting configuration. Other types and configurations of upper and lower downhole connectors 60, 70 may be used with embodiments of the connector guards. In order to prevent wellbore fluid from contaminating the joint or connection interface between the upper and lower downhole connectors 60, 70, one or more connector guards may be used to protect the connector as the completions are run downhole.

In order to maintain a clean environment for the splicing together of the downhole connectors 60, 70, embodiments of protective connector guards 100, 200 (see FIGS. 2 and 3) may be attached to the respective downhole connectors 60, 70 prior to running in the hole. In some embodiments, only one connector guard 100, or 200, may be used. The connector guards 100, 200 may be made of a dissolvable or degradable material to facilitate removal and/or to prevent the connector guards 100, 200 from interfering with or otherwise obstructing the wet-mate connection between the downhole connectors 60, 70.

For example, an embodiment of a connector guard can be made from one or more degradable and/or reactive materials. The connector guard can be partially or wholly degradable (soluble) in a designated fluid environment, such as water, brine, or other injection fluid, production fluid, drilling fluid, and/or combinations thereof. In one or more embodiments, the connector guard can be made from one or more materials that disintegrate but not necessarily dissolve in a designated fluid environment. In one or more embodiments, the connector guard can include compositions engineered to exhibit enhanced reactivity relative to other compositions that can be present in the connector guard. Further details regarding various examples of degradable or dissolvable material may be found in co-pending U.S. patent application Ser. No. 12/430,298, the contents of which are hereby incorporated by reference.

Figure 2:
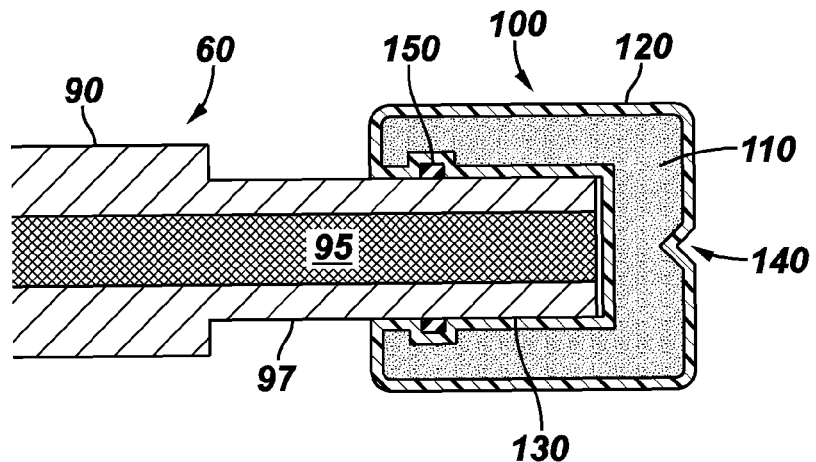
FIG. 2 is a side cross-sectional view of a connector guard and a male downhole connector in accordance with an embodiment of the invention.

Turing generally to FIG. 2, one illustrative embodiment of a connector guard 100 is shown coupled to a male downhole connector 60. The connector guard 100 may comprise a dissolvable or degradable material 110, cover 120, connector engagement section 130, removal feature 140, and seal 150. The downhole connector 60 may comprise a cable 90, engagement feature 97, and connecting member 95. The connector guard 100 may be coupled to the downhole connector 60 about the engagement feature 97 via the connector engagement section 130. In some embodiments, the downhole connector 60 and connector guard 100 may be substantially cylindrical, but other embodiments may not be limited to this configuration.

The dissolvable or degradable material 110 may be at least partially encased or enclosed by a cover 120. The cover 120 may be a non-dissolvable material or a material with a different rate of dissolvability than the underlying material 110. In some cases, the cover 120 may be permeable and function to control the exposure of the underlying material 110 to environmental conditions. In still other cases, the cover 120 may act as an insulator to slow the rate of a thermally degradable or dissolvable material 110. In some cases, the cover 120 may be a non-permeable and/or brittle material that can break in small pieces upon the application of a force, e.g., tempered glass or ceramic, among others. Depending upon the configuration of the connector guard 100, no cover 120 may be needed (e.g., using a thick cross-section of material 110 with a known dissolvability rate).

The connector engagement section 130 may comprise any of a variety of coupling methods and configurations. For example, the connector engagement section 130 may be configured to threadably or otherwise mechanically couple with the engagement feature 97 of the downhole connector 60 (e.g., snap fit connections, split c-rings, collet fingers, angled ratcheting members, among others). In some embodiments, the same engagement features provided for securing one downhole connector 60 to the mating downhole connector 70 may be used to temporarily couple the connector engagement section 130 to the downhole connector 60. In still other cases, embodiments of the connector guard 100 may be secured via adhesive bonding or friction force, such as with a press fit between the connector guard 100 and the downhole connector 60.

The removal feature 140 is shown in this exemplary embodiment as an indentation or weakened area of the connector guard 100. The removal feature 140 may be shearable, breakable, or punchable. In some embodiments, the removal feature 140 may be configured to breach only the cover 120, thereby providing access for the reactive agents, thermal conditions, or other environmental factors, to reach the underlying material 110. In still other embodiments, the removal feature 140 may lead to the fracturing of the entire connector guard 100, thereby also allowing exposure of the underlying material 110 to the various reactive components.

In some situations, embodiments of connector guards 100 may further comprise a seal 150 configured to inhibit contamination of the connecting member 95. For example, in cases in which the connecting member 95 is a fiber optic cable, it may be important to prevent debris or other contaminants from fouling the end of the connecting member 95. Seal 150 may be part of the connector guard 100 or may be part of the downhole connector 60. After removal of the connector guard 100 via breakage and/or degradation, the seal 150 may remain to seal the connection between both of the downhole connectors 60, 70.

Figure 3:
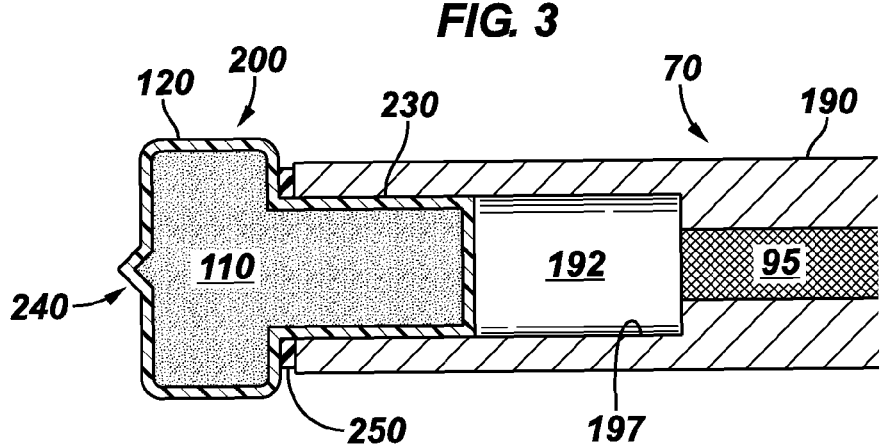
FIG. 3 is a side cross-sectional view of a connector guard and a female downhole connector in accordance with an embodiment of the invention.

Referring generally to FIG. 3, this drawing illustrates an alternative illustrative embodiment of a connector guard. The connector guard 200 may be configured to couple with a female downhole connector 70, such as shown in the drawing. In this illustrative example, the connector guard 200 may comprise a degradable or dissolvable material 110, a cover 120, connector engagement section 230, removal feature 240, and seal 250. The downhole connector 70 may comprise a cable 190, engagement feature 197, and connecting member 95. As with the previous examples, the downhole connector 70 and the connector guard 200 may be substantially cylindrical, but other embodiments may not be limited to this configuration.

Like reference numerals refer to like elements and the description thereof will not be repeated here in the interest of brevity. However, one difference in configuration from the previous description is that the connector guard 200 is adapted to couple with a female receptacle (engagement feature 197) of the downhole connector 70. As such, instead of comprising a recess to fit around the engagement feature 97 of downhole connector 60, connector guard 200 may comprise a substantially cylindrical protrusion configured to fit within engagement feature 197. As with the previous embodiment, the connector guard 200 may be retained within the engagement feature 197 via the connector engagement section 230.

An embodiment of the removal feature 240 may comprise a protruding element rather than a recessed element 140 as previously described. The protruding removal feature 240 may facilitate the breaching of the cover 120, thereby exposing the material 110 to a reactive condition or set of conditions. In addition, the removal feature 240 may provide a stress concentration point for fracturing or otherwise breaking the connector guard 200.

The connector guard 200 may further comprise a seal 250 provided between the end of the downhole connector 70 and the connector guard 200. After the connector guard 200 dissolves, degrades, or is otherwise removed from the downhole connector 70, the seal 250 may be free to separate from the downhole connector 70. In some embodiments, the seal 250 may be coupled with the downhole connector 70 and remain attached after removal of the connector guard, in which case the seal 250 may be used at least in part to seal the mating downhole connectors 60, 70.

The configuration of the connector guard 200 and the downhole connector 70 may create an enclosed void 192. In some cases, the enclosed void 192 may be filled with a reactive fluid or agent configured to degrade or dissolve the material 110 of the connector guard 200. The cover 120 may protect the material 110 until the connector guard 200 is fractured, thereby releasing the reactive agent to dissolve the material 110 of one or both connector guards, 100, 200. The reactive agent should be selected so as to not corrode or contaminate the connecting member 95.

Figure 4:
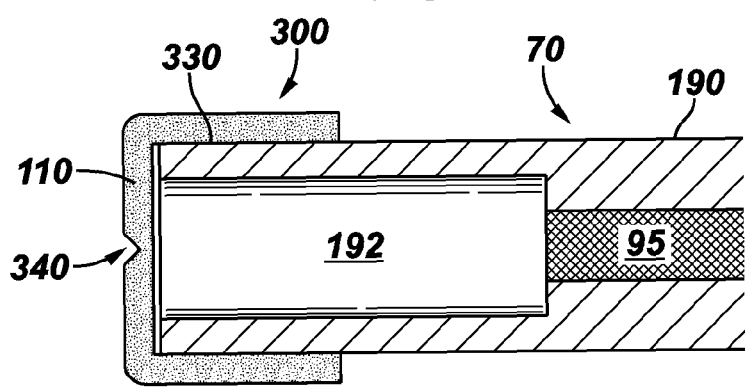
FIG. 4 is a side cross-sectional view of a connector guard and a female downhole connector in accordance with another embodiment of the invention.

Turning to FIG. 4, this drawing illustrates a connector guard 300 made of a dissolvable or degradable material 110 that couples to the outside circumference of a female downhole connector 70. The connector guard 300 may be coupled to the downhole connector 70 via a connector engagement section 330. The connector guard 300 may further comprise a weakened area or removal feature 340 configured to help break apart the connector guard 300. Coupling the connector guard 300 to the downhole connector 70 may create a void 192 configured to accommodate the engagement feature 97 of a mating downhole connector 60 (see FIG. 2). In some embodiments, the void 192 may be filled with a clean fluid provided to clear debris from the mating components of the downhole connectors 60, 70 during a wet-mate connection sequence.

Connector guard 300 is shown in this illustrative example without a cover 120 (see FIGS. 2 and 3). In this case, the material 110 may be configured with a reaction rate designed to provide enough time for the mating components to be run downhole prior to dissolving. In other situations, a reactive fluid may be provided downhole to either chemically or thermally cause the dissolving of the material 110.

Figure 5:
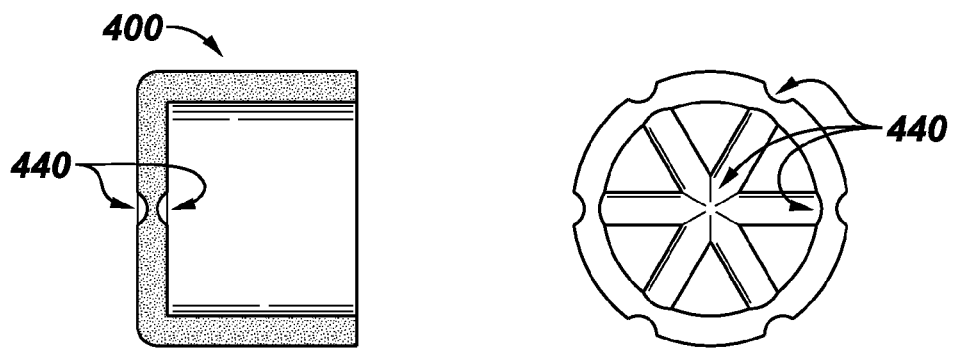
FIG. 5 is a side cross-sectional view and a rear view of a connector guard in accordance with another embodiment of the invention.

Referring generally to FIG. 5, this drawing illustrates an exemplary embodiment of a connector guard 400 in both cross-sectional view and end view. The removal features 440 may be provided on one or both of the surfaces when viewed along a central axis of the connector guard 400 in the cross-sectional view. In addition, the removal features 440 may be provided on one or both of the inner and outer circumferences of the connector guard 400 as seen in the end view. In some embodiments, the removal features 440 may be areas of weakened or highly reactive material interspersed among a slower reactive material. As shown, some removal features 440 may be in the form of a recessed or raised pattern provided on one or more surfaces of a connector guard 400.

Figure 6:
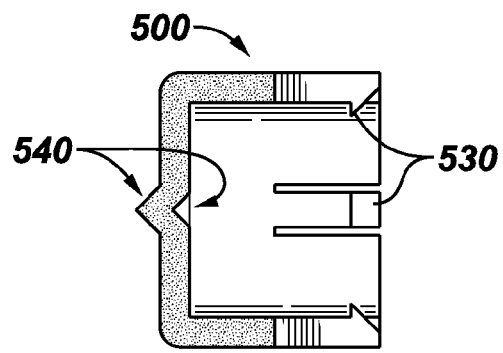
FIG. 6 is a side cross-sectional view of a connector guard in accordance with another embodiment of the invention.

In some exemplary embodiments of a connector guard, such as the connector guard 500 shown in FIG. 6, the removal features 540 may include a combination of recesses and protrusions. For example, connector guard 500 is shown comprising a non-limiting embodiment of a snap fit connection, i.e., collet fingers 530. The collet fingers 530 may interact with recesses, protrusions, or some other form of engaging feature on the corresponding downhole connector (not shown in this figure). In this particular embodiment, the connector guard 500 would comprise four collet fingers, although only three may be seen in the cross-sectional view.

Figure 7:
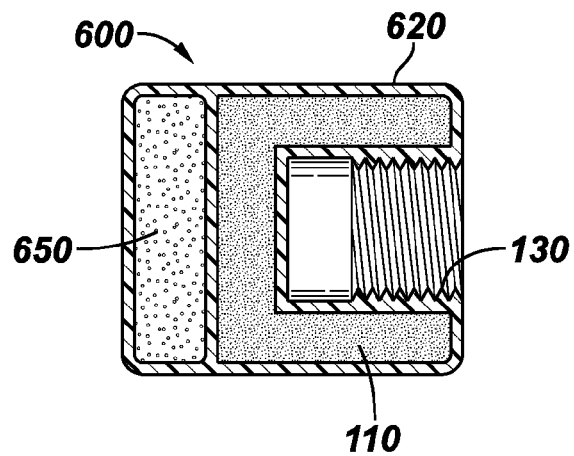
FIG. 7 is a side cross-sectional view of a connector guard in accordance with another embodiment of the invention.

Another alternative embodiment of a connector guard 600 may be seen in FIG. 7. In this illustrative case, the cover 620 for the dissolvable material 110 may include a chamber 650 configured to enclose a reactive agent or fluid. During a wet-mate connection sequence between two downhole connectors the cover 620 of one or both of the connector guards may be ruptured or breached, allowing the reactive agent or fluid to contact and dissolve the underlying material 110. The amount of reactive agent or fluid may be determined to dissolve one or both of the connector guards 600 (e.g., if two connector guards 600 are used). However, only one connector guard 600 may have a chamber 650 filled with reactive material. The connector guard 600 may be coupled with the downhole connector (not shown) via an engagement section such as the threadable section 130 shown in the figure.

While the invention has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the invention.

What is claimed is:

1. A system for temporarily protecting a connector, comprising:
    a connector guard, having:
        a body comprising a material that is dissolvable or degradable when exposed to one or more conditions configured to dissolve or degrade the material;
        a connector interface configured to attach to a downhole connector; and
        a removal feature to facilitate breaking apart of the connector guard to enable engagement between downhole connectors.

2. The connector guard of claim 1, wherein the body is covered with a coating configured to inhibit dissolving or degrading of the body.

3. The connector guard of claim 1, wherein the connector interface comprises threads.

4. The connector guard of claim 1, wherein the connector interface comprises a collet.

5. The connector guard of claim 1, wherein the connector interface comprises a split c-ring.

6. A method for protecting downhole connectors during a downhole mating sequence comprising:
    covering at least one of a mating pair of downhole connectors with a dissolvable or degradable connector guard;
    breaking a coating on the dissolvable or degradable connector guard during mating of the downhole connectors;
    exposing the dissolvable or degradable connector guard to conditions that dissolve or degrade the dissolvable or degradable connector guard, wherein breaking further comprises releasing a liquid agent configured to dissolve the dissolvable or degradable connector guard stored in the coating.

7. The method as recited in claim 6, wherein covering further comprises threadably attaching the dissolvable or degradable connector guard to the at least one of the downhole connectors.

8. The method as recited in claim 6, wherein the downhole connectors may be a hydraulic, electrical, or fiber optic, or combination thereof.

9. The method as recited in claim 6, wherein covering further comprises attaching the dissolvable of degradable connector guard to the at least one of the downhole connectors via a snap-fit connection.

10. The method as recited in claim 6, wherein covering further comprises attaching the dissolvable or degradable connector guard to the at least one of the downhole connectors via an adhesive material.

11. The method as recited in claim 6, wherein exposing further comprises increasing a temperature proximate to the dissolvable or degradable connector guard.

12. The method as recited in claim 6, wherein the mating pair of downhole connectors is covered with a dissolvable or degradable connector guard.

13. A downhole connector guard comprising:
    a body comprising a dissolvable material containing a recess configured to couple with a downhole connector; and
    a coating configured to control the dissolving of the body, wherein the coating further encloses a material to dissolve or degrade the body.

14. The downhole connector guard as recited in claim 13, wherein the coating is a non-permeable material.

15. The downhole connector guard as recited in claim 13, wherein the coating is a controlled permeable material.

16. The downhole connector guard as recited in claim 13, wherein the body is configured to couple to the downhole connector via a snap fit engagement.

* * * * *